Patented Dec. 13, 1938

2,140,235

UNITED STATES PATENT OFFICE 2,140,235

WHITE PIGMENT

Ekbert Lederle, Ludwigshafen, Max Günther, Mannheim, and Rudolf Brill, Heidelberg, Germany No Drawing. Application March 14, 1935, Serial No. 11,164. In Germany March 14, 1934

5 Claims. (Cl. 134—78)

This invention relates to the manufacture of non-chalking white pigments containing titanates.

A drawback well known in the paint industry is the so-called chalking of paint coatings. The cause of this is that the paint or its binding agent is destroyed which becomes evident in the occurrence of loose pigment particles on the film surface. Especially the white pigments show this drawback to a more or less great extent, particularly such pigments as contain titanium dioxide.

In accordance with the present invention it has been found that zinc titanate having the crystalline structure of spinel and/or corundum yields excellent white pigments which are distinguished particularly in that they are fast to chalking and are weather-proof. This essential advance is due to the particular properties of the zinc titanate crystals and by the absence of unbound titanium dioxide. Such zinc titanates are zinc orthotitanate, zinc metatitanate and mixed crystals of these two compounds. Zinc titanate pigments are obtained by heating zinc oxide with titanium dioxide in the proportion of at least 0.9 mol of zinc oxide upon 1 mol of titanium dioxide at temperatures between 500 and 1100° C. The mixture is kept at these temperatures until the whole titanium dioxide is bound to zinc oxide in the form of zinc titanate so that then practically no free titanium dioxide is present. When using more than about 1.5 mols of zinc oxide upon 1 mol of titanium dioxide exclusively mixed crystals of zinc titanate having the crystalline structure of spinel are obtained, whereas between 1 and about 1.5 mols of zinc oxide at higher temperatures, for instance, 900–1100° C., mixtures of zinc titanate crystals of the spinel crystalline form with those of the corundum crystalline form, and at lower temperatures, for instance, 500–900° C., likewise mixed crystals of the spinel crystalline form are obtained. When using more than 2 mols of zinc oxide upon 1 mol of titanium dioxide the excess is not bound. However, more than 2 mols of zinc should generally not be necessary. The pigments consisting of zinc titanate having the crystalline structure of spinel or those having the crystalline structure of corundum as well as the pigments consisting of the mixtures mentioned above, i. e. having crystalline structure selected from the group consisting of corundum and spinel are distinguished by a pure white color and are fast to chalking.

The pigment-technical properties of the pigments may be considerably improved by replacing one part of the zinc by magnesium. The advantages of the zinc magnesium titanate pigments thus obtained are to be seen in a greater hardness and resistivity of the color film as well as in a higher white content (albedo), together with a better covering power and tinting strength. Furthermore, the tendency of the paint to become yellow during drying which is peculiar to certain binding agents is overcome to a great extent in the pigments containing magnesium.

Further, it has been found that the size of the primary particles of the zinc titanate is of particular importance for their behaviour when used as paint. While the secondary particles determine the pigment-technical behaviour of a pigment (for instance covering power), the size of the primary particles determines their catalytic behaviour (polymerization of the linseed oil, its destruction by atmospheric influences and the like). The determination of the size of the primary particles of zinc titanates arrived at by X-ray photography has shown that as soon as sharp interferences are formed, that is at a size of primary particles of more than $10^{-6}$ cm. and at increased sharpness of the X-ray interference lines and therewith also increasing size of the primary particles, the paints made with these pigments are more resistant to the influence of the weather. For obtaining the desired size of the particles it is advantageous to effect the formation of the titanate at temperatures of between about 500 and 800° C. and to heat the titanate to a temperature of up to 1100° C.

In the manufacture of the non-chalking zinc titanate or zinc magnesium titanate pigments it is possible to start directly with the corresponding oxides, for instance, zinc oxide or magnesium oxide and titanium dioxide or titanium dioxide hydrates. Instead of the zinc- or magnesium oxide also such compounds can be used which on heating yield these oxides, for instance, carbonates, hydrocarbonates, compounds containing sulfur and oxygen etc. The zinc oxide used may be obtained by precipitation, for instance, in the manufacture of sodium hydrosulfite from zinc hydrosulfite solutions, or pyrogenically. The zinc may also be employed wholly or partially as metallic zinc in a finely dispersed form, for instance, zinc dust, whereby heating is to be effected in the presence of an oxidizing agent, for instance, air. Thus, any zinc or magnesium compound, or even the metals themselves which on heating to a temperature within the range stated above yield the corresponding oxides may be used in the practice of our invention and in this description and in the claims appended hereto, we have employed the terms "reactive zinc compound" and "reactive magnesium compound" to designate such compounds. Instead of titanium dioxide also other titanium compounds, for instance, titanium sulfate may be employed, whereby the quantity of zinc or magnesium oxide in the manufacture of the starting material in every case must be calculated on the quantity of titanium dioxide contained in the compound.

The process of manufacturing white pigments is advantageously performed in such a manner that the starting materials, eventually with the addition of water, are well mixed and are then heated in a rotary kiln either in the wet or dry state. The reaction time required may easily be established by testing the mixture from time to time during heating and by determining the quantity of the not yet bound zinc oxide by extraction with ammoniacal ammonium salt solution. From the difference between consumed and free zinc oxide, the quantity of the bound zinc oxide and therewith also the bound titanium dioxide is obtained. By the addition of mineralizers, as for instance, alkali metal sulfate or chloride, if desired also by the addition of substances, such as borates, wolframates, vanadates or the like the duration of the reaction can be decreased. By the term "mineralizer" as used in this description and in the claims appended hereto, we mean substances, for example, those just enumerated which, acting as a flux, produce a slight sintering action during the heating of the reactive zinc compound with the titanium dioxide. When using mineralizers in the practice of my invention it will be understood that the quantity employed should not be so great as to bring about a fusion of the reaction mixture. Mixed crystals from zinc-meta-titanate and zinc-ortho-titanate of the spinel type may be prepared by mixing zinc titanates with various zinc contents and by uniting them to form a uniform product by means of a calcining process.

The starting mixture required for effecting the reaction may be produced by means of precipitation, for instance, by precipitating from zinc salt solutions or solutions containing besides a zinc salt also a magnesium salt upon titanium dioxide suspended therein, the corresponding metal oxides or hydroxides or hydrocarbonates in an appropriate proportion and washing, whereupon the wet or previously dried mixture is treated in the above described manner. Furthermore, the reaction components can be obtained by simultaneous precipitation from solutions containing soluble titanium salts, for example, titanium sulfate, as well as zinc compounds and also, if desired, magnesium compounds.

In some cases it is advisable not to wash the starting mixtures obtained by precipitation before heating or only to wash them incompletely, especially in such cases where they contain substances forming effective mineralizers. In order to improve the tinting strength and to obtain a softer texture of the pigments, the starting mixture prior to, or the product obtained after, heating may be subjected to a heat treatment below 500° C. in the presence of water or steam, if desired under pressure. After this treatment the product may be washed out and dried or calcined.

By way of the ordinary after-treatments, for instance, chilling off or finely grinding the pigments obtained may be further improved; further, they may be blended with the usual stretching agents, for instance, barium sulfate. In order to remove the last traces of unbound zinc or magnesium oxide, the pigments may be lixiviated with ammoniacal ammonium salt solution, whereupon the product which is freed from zinc and magnesium oxide is heated again if desired.

It is known that zinc orthotitanate ($Zn_2TiO_4$) crystallizes in the form of spinel and such preparations have already been prepared for detecting the spinel formation by way of X-ray photography. However, it was impossible to prepare zinc orthotitanate which is free from unbound $TiO_2$, since either the calcining temperatures were too low, or the time for calcining was too short, or the calcining temperatures from the beginning were too high, this bringing about incomplete reaction or the formation of non-reactive titanium dioxide. Occasionally zinc oxide has been added to titanium dioxide pigments with the intention of neutralizing acid residues still present and render them innocuous. These processes have nothing in common with the present invention since in all these cases a considerable excess of titanium dioxide is present in the pigment, whereas according to the present process it is just the presence of unbound titanium dioxide which has to be prevented. Zinc metatitanate ($ZnTiO_3$) was hitherto unknown either in corundum crystalline form or in spinel crystalline form. Surprisingly it has been found that zinc ortho and zinc metatitanate both having the crystalline structure of spinel are able to form mixed crystals though they are chemically different. The complete transformation to zinc titanate and the absence of free titanium dioxide is detectable by X-ray analysis and in connection therewith also chemically. All zinc titanates when treated with ammoniacal ammonium salt solution only give off the unbound zinc oxide to the said reagent. Pigments which are fast to chalking and being weather-proof, however, are obtained when according to the present invention at least 0.9 mol of the zinc oxide calculated upon $TiO_2$ are insoluble in ammoniacal ammonium salt solution, for the pigments are then practically free from unbound $TiO_2$. On treating with dilute mineral acids, the zinc titanates give off part of the titanium or all titanium to the solvent; the behaviour to dilute acids, however cannot be taken as a criterion for the titanate formation, since complete solution already takes place on heating 1 part of zinc oxide with 2 parts of titanium dioxide for 10 hours at 350° C. whereby, as shown by X-ray analysis, no zinc titanate formation can be established.

The zinc titanate pigments may be mixed with extenders, for instance, zinc oxide, alkaline-earth metal sulfates, for instance, barium sulfate, whereby the zinc oxide may be added to the reaction mixture directly.

The invention is further illustrated by the following examples without being restricted thereto:

*Example 1.*—91 parts by weight of a yellow zinc oxide resulting from the manufacture of hydrosulfite and containing 98% of ZnO are thoroughly mixed with 98 parts by weight of titanium dioxide hydrate (81.5% $TiO_2$) and 125 parts by weight of water. The viscous magma obtained is caused to run into a rotary kiln which is heated to 820° C., the velocity of which kiln being fixed so that the material remains therein for 1½ hours. The mixture is kept in the calcining region of the kiln until by extraction of a test portion of the finished product with a solution containnig 120 grams of $NH_3$ per liter and 110 grams of $CO_2$ it has been established that at the most only 5% of the zinc oxide employed are present in the unbound state. The red-hot product coming from the kiln is chilled with cold water and further treated in the usual manner. A mixture consisting of mixed crystals of zinc ortho- and meta-titanates with a molar proportion of Zn:Ti=1.09:1 is obtained. It is a pure white pigment of good tinting strength which displays great resistivity to weather and which does not chalk.

*Example 2.*—68.5 parts by weight of a waste zinc oxide consisting of 87% of zinc oxide, 11% of metallic zinc and 2% of water are ground for several hours in a ball mill with 6.1 parts by weight of magnesium oxide and 98 parts by weight of titanium dioxide hydrate (81.5% $TiO_2$). The mixture is then heated together with 250 parts by weight of water in a pressure vessel while moving (rotating drum or stirrer) for 4 hours to 200° C. After allowing to settle and after pouring off the water the residue is introduced into a rotary kiln having a temperature of 850° C. through which kiln a weak current of air is blown during the whole calcining process. The period during which the residue is to remain in the kiln is determined in the manner indicated in Example 1. A pigment consisting of zinc metatitanate, wherein 15% of the zinc is isomorphously replaced by magnesium is obtained. The finished white pigment is about 20% stronger in color than the product obtained according to Example 1. A linseed oil paint containing the pigment dries without becoming yellow and the color film is resistant to weather influences for a long time and retains its pure white color.

*Example 3.*—In a suspension of titanium dioxide hydrate in dilute sulfuric acid as obtained by means of hydrolysis of a titanium sulfate solution, so much zinc oxide and magnesium oxide are dissolved if desired with the addition of a further quantity of sulfuric acid that upon 1 mol of $TiO_2$ 1.6 mols of $ZnSO_4$ and 0.4 mol of $MgSO_4$ are present. The whole quantity is heated to 70° C. and treated with a likewise 70° C. warm solution of 2.1 mols of sodium carbonate for one hour with continuous stirring. The substance at the bottom of the liquid, consisting of an intimate mixture of titanium dioxide hydrate with zinc- and magnesium hydrocarbonate is separated from the supernatant solution and calcined without previous washing out in a rotary kiln at 875° C. for one hour. The hot product is chilled in water and freed from its sulfate content by decanting. The pigment magma is finely ground in a mill while wet and dried at 110° C. The finished pure white pigment (zinc ortho-titanate) is somewhat less strong in color than the pigment obtained according to Examples 1 and 2 but it is weather-proof and fast to chalking and, on account of its small content of titanium, can be more cheaply manufactured.

*Example 4.*—71 parts by weight of zinc dust (containing 92% of metallic zinc) are thoroughly mixed with 98 parts by weight of titanium dioxide hydrate and conducted in a thin layer at 800° C. through an obliquely inclined rotary kiln which is open at both ends. The time required for the reaction is established according to Example 1. A pure white product consisting of mixed crystals of zinc ortho- and metatitanate with a molar proportion Zn:Ti=1.08:1 corresponding in its pigment and film properties to the product obtained according to Example 1 is thus obtained.

*Example 5.*—A mixture of 4 parts by weight of zinc metatitanate is calcined with 1 part by weight of zinc oxide at 850° C. until the mixture is converted into a white pigment consisting of mixed crystals of zinc meta- and orthotitanate in the proportion 1:1. The product because of its favorable size of primary particles has excellent color technical properties. The product in X-ray analysis according to Debye-Scherrer yields comparatively sharp interferences.

*Example 6.*—3 parts by weight of zinc oxide and 1 part of titanium dioxide are thoroughly mixed and calcined for about 2 hours at 1000° C. The end product is free from unbound titanium dioxide and is distinguished by great resistivity to weather.

*Example 7.*—Mixed crystals of the composition indicated in Example 5 are mixed with about 10% of magnesium oxide, whereupon the whole mixture is calcined during a short time at 700° C. The whole magnesium oxide is bound thereby. The pigment obtained is of excellent resistivity to weather, so that it is very well suitable for outside coatings.

*Example 8.*—A white pigment of mixed crystals with especially large primary particles and therefore possessing great resistivity to weather is obtained when calcining zinc- ortho- and meta-titanate in the proportion 1:1 for 2 hours at 900° C. The primary particles of this product are about 30–40% larger than the particles of the pigment obtained according to Example 5 and about twice as large as the particles of the starting materials.

*Example 9.*—A mixture of zinc oxide and titanium dioxide hydrate prepared in accordance with the directions given in Example 1 is calcined for 1½ hours at 820° C. The temperature is then either increased to 850° C. and calcining takes place for a further hour, or the duration of the calcining process is prolonged for further 1½ hours. A product of excellent resistivity to weather is obtained. While the pigment according to Example 1 yields only slightly sharp interferences according to X-ray analysis, the product of this example yields comparatively sharp interferences which is brought about by the larger primary particles formed on account of the more intensive calcination.

*Example 10.*—A mixture of 1.8 parts of zinc oxide and 1 part of titanium dioxide crystallizing either as anatase or rutile is heated for 5 hours at 880° C. Thus mixed crystals of excellent pigment properties are obtained, brought about by the size of the primary particles because of the use of a titanium dioxide crystallizing in the form of anatase or rutile.

We claim:—

1. Process of preparing a white pigment which comprises calcining at a temperature between about 500° C. and about 800° C. a mixture of a reactive zinc compound and titanium dioxide in the proportion of between .9 and 2 mols of reactive zinc compound to 1 mol of titanium dioxide for such a time that the titanium dioxide is practically completely bound to the zinc and thereafter heating the resulting product at a higher temperature not exceeding about 1100° C. until it exhibits sharp interference lines on an X-ray photograph.

2. Process of preparing a white pigment which comprises calcining at a temperature between about 500° C. and about 800° C. a mixture of zinc oxide and titanium dioxide in the proportion of between .9 and 2 mols of zinc oxide to 1 mol of titanium dioxide for such a time that the titanium dioxide is practically completely bound to the zinc and thereafter heating the resulting product at a higher temperature not exceeding about 1100° C. until it exhibits sharp interference lines on an X-ray photograph.

3. Process of preparing a white pigment which comprises calcining at a temperature between about 500° C. and about 800° C. a mixture of a reactive zinc compound and titanium dioxide in the proportion of substantially 2 mols of a reactive zinc compound to 1 mol of titanium dioxide for such a time that the titanium dioxide is practically completely bound to the zinc as zinc orthotitanate having the crystalline structure of spinel and thereafter heating the resulting product at a higher temperature not exceeding about 1100° C. until it exhibits sharp interference lines on an X-ray photograph.

4. A white pigment substantially free from unbound titanium dioxide comprising zinc oxide and titanium dioxide in the proportion of between about .9 to 2 mols of zinc oxide to 1 mol. of titanium dioxide, said pigment being substantially identical with the product obtained by the process of claim 1.

5. A white pigment substantially free from unbound titanium dioxide comprising a zinc orthotitanate having the crystalline structure of spinel, said pigment being substantially identical with the product obtained by the process of claim 3.

EKBERT LEDERLE.
MAX GÜNTHER.
RUDOLF BRILL.